May 29, 1923.  1,456,863
T. J. BLONG
ELECTRO HEAT RADIATING DEVICE FOR WATER HEATING SYSTEMS
Filed Feb. 14, 1921  2 Sheets-Sheet 1
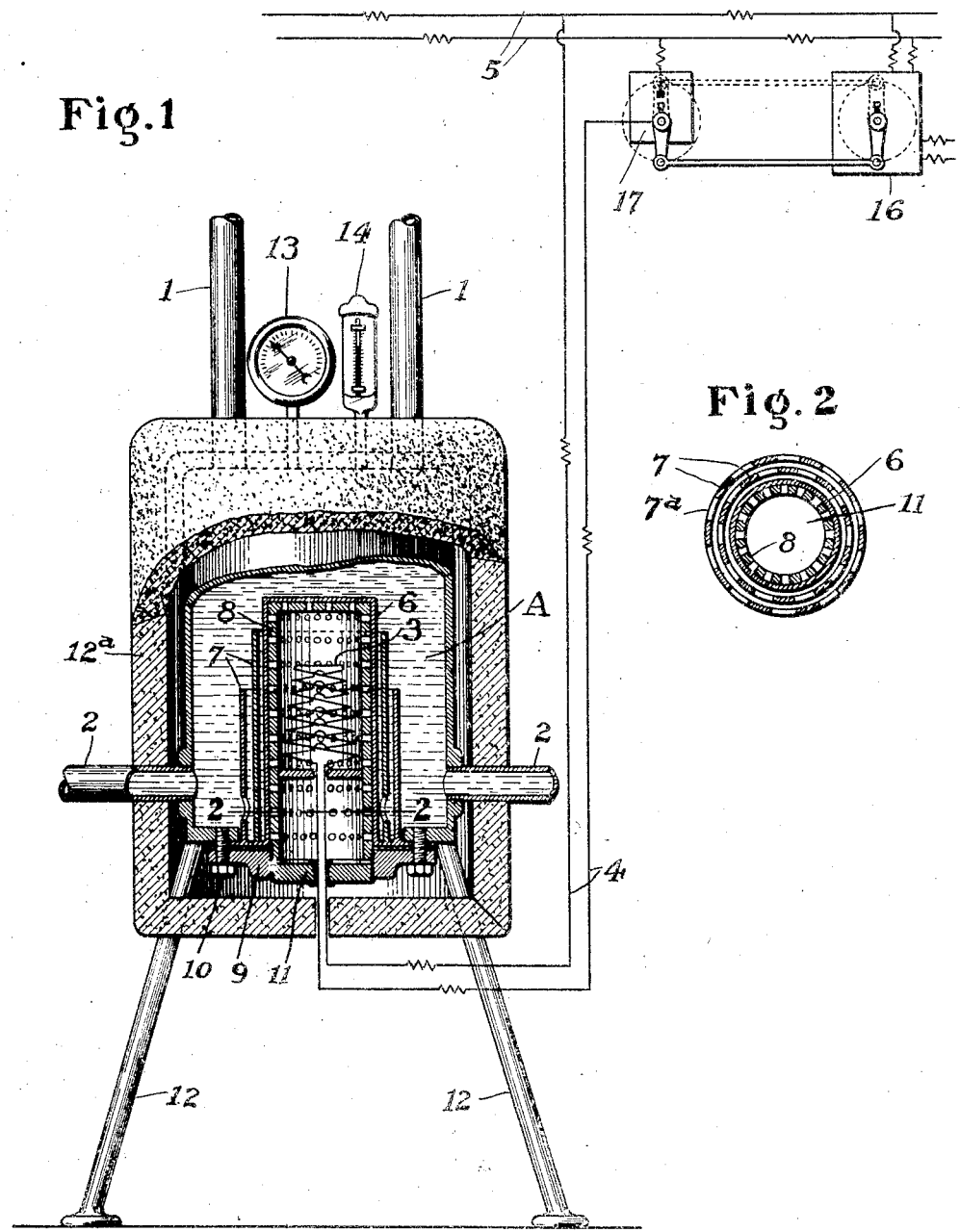
INVENTOR
Thomas J. Blong
BY Bakewell Church
ATTY'S

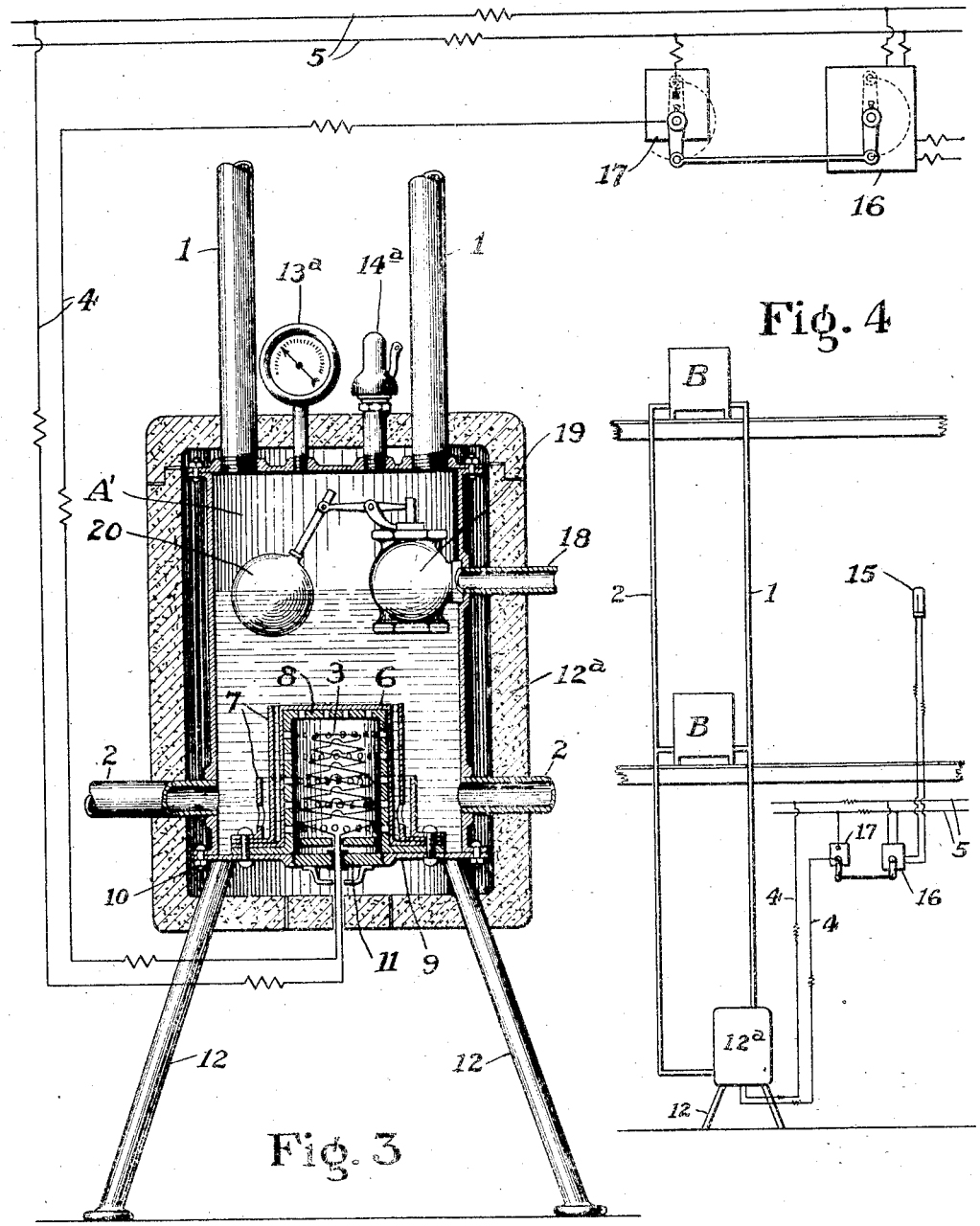

Patented May 29, 1923.

1,456,863

UNITED STATES PATENT OFFICE.

THOMAS J. BLONG, OF ST. LOUIS, MISSOURI.

ELECTRO-HEAT-RADIATING DEVICE FOR WATER-HEATING SYSTEMS.

Application filed February 14, 1921. Serial No. 444,771.

*To all whom it may concern:*

Be it known that I, THOMAS J. BLONG, a citizen of the United States, residing at St. Louis, Missouri, have invented a certain new and useful Improvement in Electro-Heat-Radiating Devices for Water-Heating Systems, of which the following is a full, clear, and exact description, such as will enable others skilled in the art to which it appertains to make and use the same.

This invention relates primarily to heating systems of the type which comprises radiators through which hot water or steam circulates, although one feature of my invention consists of an electrically-operated water heating apparatus capable of use for various purposes.

The main object of my invention is to provide an efficient heating system in which the means for heating the water or generating the steam used in the heat radiating devices of the system consists of an electrically-operated heating apparatus controlled automatically by the temperature of the building in which the system is used and constructed in such a manner that it can be operated for a fraction of the cost of the conventional steam and hot water heating systems equipped with coal fired boilers or heaters.

Another object is to provide an apparatus for heating water or generating steam which comprises a water container, an electrically-operated heating device in said container composed of an electric heating element arranged inside of a closed shell that is submerged in the water in the container and baffles combined with said shell in such a manner that the water entering said container will be first heated by radiant heat from said baffles and then drawn into a high temperature zone wherein the temperature of the water is instantly raised to such a high degree that an exceptionally rapid circulation through said container is attained.

Figure 1 of the drawings is a side elevational view, partly in vertical section, of electrically-operated water heating apparatus constructed in accordance with my invention and adapted for use with a hot water heating system.

Figure 2 is a horizontal sectional view, taken on the line 2—2 of Figure 1.

Figure 3 is a vertical sectional view of an apparatus constructed in accordance with my invention and adapted for use with a steam heating system; and Figure 4 is a diagrammatic view, illustrating a heating system embodying my invention.

Referring to Figure 1 of the drawings which illustrates an apparatus embodying my invention and designed for use with a hot water heating system, A designates the water container of the apparatus, 1 designates one or more supply pipes leading from said container to the radiators or other heat radiating devices B of the heating system with which the apparatus is used, as shown in Figure 4, and 2 designates one or more return pipes that lead from said radiating devices B back to the water container A. The size of the container A will, of course, vary according to the capacity of the heating system, but I have found that in a hot water heating system having approximately 900 feet of radiation a container A of approximately 5 gallons capacity is sufficient to operate the system. The water in the container A is heated by an electrically-operated heating means which is preferably composed of an electric heating element 3 of any suitable form arranged in an electric circuit 4 to which current is supplied from a main supply circuit 5, a closed shell 6 inside of which said heating element is arranged and a plurality of baffles 7 that surround the shell 6, said shell and baffles being submerged in the water in the container A. The shell 6 and baffles 7 are preferably formed of thin sheet copper or other suitable material that is a good conductor of heat, and in order to prevent said shell from collapsing or being crushed by the pressure of the water surrounding same, I prefer to arrange a perforated reinforcing device 8 on the interior of said shell, as shown in Figure 1. The particular shape and construction of the shell 6 and baffles 7 is immaterial, so far as my broad idea is concerned, but it is preferable to arrange the baffles in concentric relation with the shell and spaced quite close together and provide said baffles with staggered holes 7ª, as shown in Figure 2, so as to cause the inflowing water to follow a tortuous path before coming in direct contact with the shell 6. Said shell is cut off from the atmosphere so as to maintain a partial vacuum inside of same when the heating element 3 is energized, and in the form of my invention herein shown the shell 6 and baffles 7 are cylindrical shaped in general outline so that they will co-operate with each other to form a plurality of concentric annular heating zones through which the inflowing water circulates in passing from the return pipe 2 to the supply pipe 1. The shell 6 and baffles 7 can be conveniently supported by a horizontally-disposed plate 9 forming part of the bottom of the water container A and retained in position by fastening devices 10, and said plate is preferably provided with a removable screw-threaded plug 11 that serves as a closure for the lower end of the shell and which can be removed when it is desired to inspect or replace the heating element 8. The water container A can be supported in any suitable manner, as, for example, by means of legs 12 and said container is completely enclosed in a casing 12ª of suitable heat insulating material which is preferably spaced slightly away from the exterior of the container A so as to provide an air space between said parts. When the apparatus is designed for use with a hot water heating system, as shown in Figure 1, it is equipped with an altitude gauge 13 and a thermometer 14 for indicating the temperature of the water in the container A. When the apparatus is in operation the water that enters the container A through the return pipe or pipes 2 comes in contact with the outer baffles 7 and is heated by the heat that radiates from said baffle. This partially heated water then flows into the annular zone between the two baffles 7, and in traveling through said zone, is further heated by the heat which radiates from both walls of the zone, or, in other words, from both the baffles. Finally, the water enters the high temperature zone formed by the shell 6 and the baffle 7 that surrounds said shell. In this high temperature zone the temperature of the water is raised instantly to such a degree that it circulates upwardly over the surface of the shell 6 and towards the water discharge pipe or pipes 1 leading from the upper end of the container A, the water absorbing heat from the shell 6 while it is flowing upwardly over same, and consequently, becoming heated to an exceptionally high temperature, due primarily, to the fact that the water is virtually in the form of a thin film while it is traveling upwardly over the sides of the highly heated shell 6. Accordingly, such an apparatus not only ensures the temperature of the water being raised instantly to an exceptionally high degree, but it induces a rapid circulation through the entire system, due to the rapid upward circulation through the high temperature zone formed by the narrow annular space between the shell 6 and the baffle 7 that immediately surrounds same.

In order that the apparatus will be automatic in its operation, I have equipped the system with a thermostat 15 of any suitable type, indicated diagrammatically in Figure 4, that is combined with an electric circuit and with an electric actuating device 16 in such a manner that when the temperature of the building in which the system is installed varies the actuating device 16 will operate a switch 17 that controls the circuit 4 in which the heating element 8 is arranged. For example, if the temperature drops below a certain degree, the thermostat 15 will close an electric circuit in which the actuating device 16 is arranged, and thus cause the actuating device 16 to operate and impart movement to the controlling element of the switch 17 in a direction to close the circuit 4. As soon as the circuit 4 closes, the heating element 8 becomes energized, thereby raising the temperature of the water in the system. When the temperature of the building is restored to normal the condition of the thermostat will change and the actuating device 16 will move the controlling element of the switch 17 in a direction to open the circuit 4 and thus render the heating element 8 inoperative. It will thus be seen that in my improved heating system the heating apparatus is cut into and out of service automatically as the temperature of the building in which the system is installed varies.

In Figure 3 of the drawings I have illustrated a heating apparatus constructed in accordance with my invention that is particularly designed for use with a steam heating system. In general construction and design said apparatus is the same as the apparatus illustrated in Figure 1, except that the container A' is only partially filled with water so as to leave a steam space in the upper end of said container, and means is provided for supplying water automatically to said container, such, for example, as a water supply pipe 18 equipped with a valve 19 that is controlled by a float 20 in the container A'. The apparatus shown in Figure 3 is also provided with a steam pressure gauge 13ª instead of an altitude gauge and a safety valve 14ª instead of a thermometer.

A heating system of the construction above described can be built and installed at a materially lower cost than a steam or hot water heating system equipped with a coal fired boiler or heater on account of the simplicity of the heating apparatus, it can be operated at a fraction of the cost of the conventional steam or hot water heating systems and it overcomes the most objectionable characteristics of the conventional heating systems, namely, the supplying of fuel or coal, frequent firing of the heating apparatus and removing the ashes produced by the burning of the fuel. Further, the elimination of dirt, dust and the omission of the customary boiler and coal room space required by the conventional heating systems, lessens considerably the present high cost of maintenance and operation of other forms of heating devices. Hence, the initial cost of constructing buildings is materially lessened and the subsequent installation of my invention insures the maximum economy and simplicity of operation. While the heating apparatus herein illustrated is particularly adapted for use with heating systems, I wish it to be understood that said apparatus can be employed for heating water or generating steam used for various other purposes.

Having thus described my invention, what I claim as new and desire to secure by Letters Patent is:

1. A heating system, comprising heat radiating devices through which a heating medium circulates, a heating apparatus comprising a water container connected by supply and return pipes with said heat radiating devices, a heating device in said container consisting of a closed shell immersed in the water in said container, an electric heating element in said shell, and a plurality of baffles arranged in concentric relation with said shell in such a manner that they co-operate with said shell and with each other to form heating zones through which the water circulates in its passage through said container.

2. A heating system, comprising heat radiating devices through which a heating medium circulates, a heating apparatus comprising a water container connected by supply and return pipes with said heat radiating devices, a heating device in said container comprising a closed shell immersed in the water in said container, an electric heating element in said shell, a plurality of baffles surrounding said shell and provided with openings through which the water returned to said container circulates, and means for rendering said heating element operative and inoperative automatically according to variations in the temperature of the building in which the system is installed.

3. A water heating apparatus, comprising a water container, a closed shell immersed in the water in said container and equipped with an electrically-operated heating element, and a plurality of baffles arranged in concentric relation with said shell and provided with staggered openings so as to cause the water in said container to travel towards said shell and then circulate upwardly in contact with the side wall surface of said shell.

4. A water heating apparatus, comprising a water container provided with a water inlet and a water discharge, a closed shell immersed in the water in said container, an electric heating element arranged inside of said shell, and means whereby the water admitted to said container will be gradually heated by the heat radiating from said shell and then drawn into a high temperature zone, one wall of which is formed by the exterior of said shell.

5. A water heating apparatus, comprising a water container provided with a water inlet, a closed shell immersed in the water in said container and formed from relatively thin sheet material that is a good conductor of heat, a reinforcing means in said shell for preventing it from collapsing, an electric heating element in said shell, and a baffling means interposed between said shell and said water inlet.

6. A water heating apparatus, comprising a water container provided with a water inlet, an outer casing of heat insulating material surrounding said container and spaced away therefrom, a closed shell in said container formed of thin sheet material that is a good conductor of heat, a removable closure for one end of said shell, an electric heating element arranged inside of said shell, and a plurality of baffles surrounding said shell and provided with staggered openings.

7. A water heating apparatus, comprising a water container provided with a water inlet, an outer casing of heat insulating material surrounding said container and spaced away therefrom, a closed shell in said container formed of thin sheet material that is a good conductor of heat, a removable closure for one end of said shell, an electric heating element arranged inside of said shell, a plurality of baffles surrounding said shell and provided with staggered openings, and a removable bottom portion for said container that carries said shell and baffles.

THOMAS J. BLONG.